(12) United States Patent
Vermeulen et al.

(10) Patent No.: US 8,798,090 B2
(45) Date of Patent: Aug. 5, 2014

(54) SYSTEM AND METHOD FOR CREATING A SLOT TABLE ENTRY ADDRESS FOR A COMMUNICATIONS DEVICE

(75) Inventors: Hubertus Gerardus Hendrikus Vermeulen, Eindhoven (NL); Abhijit Kumar Deb, Eindhoven (NL); Sujan Pandey, Eindhoven (NL)

(73) Assignee: NXP B.V., Eindhoven (NL)

( * ) Notice: Subject to any disclaimer, the term of this patent is extended or adjusted under 35 U.S.C. 154(b) by 440 days.

(21) Appl. No.: 13/239,151

(22) Filed: Sep. 21, 2011

(65) Prior Publication Data

US 2013/0070783 A1   Mar. 21, 2013

(51) Int. Cl.
*H04L 12/43* (2006.01)
(52) U.S. Cl.
USPC ............ 370/458; 370/442; 370/478; 710/305
(58) Field of Classification Search
None
See application file for complete search history.

(56) References Cited

U.S. PATENT DOCUMENTS

| 2005/0254518 | A1* | 11/2005 | Fujimori | 370/466 |
|---|---|---|---|---|
| 2009/0175290 | A1 | 7/2009 | Newald et al. | |
| 2010/0020828 | A1* | 1/2010 | Angelow | 370/498 |
| 2010/0268910 | A1* | 10/2010 | Papenhoven | 711/200 |

FOREIGN PATENT DOCUMENTS

WO   2009/063347 A1   5/2009

OTHER PUBLICATIONS

"FlexRay Communications System Protocol Specification, Version 2.1, Rev. A", FlexRay Consortium, 246 pgs. (Dec. 2005).
Extended European Search Report for European Patent Appln. No. 12181625.0 (Feb. 11, 2013).
P. Milbredt, B. Vermeulen, G. Tabanoglu and M. Lukasiewycz, "Switched FlexRay: Increasing the Effective Bandwidth and Safety of FlexRay Networks", in Proc. IEEE Conf. Emerging Technologies and Factory Automation (ETFA), pp. 1-8, 2010.
FlexRay Communications System Protocol Specification, ver 3.0, FlexRay consortium, Dec. 2009.
FlexRay Communications System Preliminary Central Bus Guardian Specification, ver 2.0.9, FlexRay consortium, [Online], http://www.flexray.com (as of Dec. 22, 2010).

* cited by examiner

*Primary Examiner* — Bob Phunkulh (57) ABSTRACT

An invention for generating a slot table entry address for a communications device of a communications network includes a method that involves processing a slot counter value according to a configuration setting value to produce a processed slot counter value, the slot counter value identifying a time slot of data communications of the communications network, masking a cycle counter value according to the configuration setting value to generate a masked cycle counter value, where the cycle counter value identifies a communications cycle containing the time slot, and processing the processed slot counter value and the masked cycle counter value to generate a slot table entry address such that a corresponding slot table entry of the time slot of the communications cycle in a slot table is accessed by the communications device at the slot table entry address.

20 Claims, 8 Drawing Sheets

| CYCLE COUNT | SLOT COUNT | | | | |
|---|---|---|---|---|---|
| | ... | 2 | 3 | 4 | ... |
| 0 | ... | 8 | 12 | 16 | ... |
| 1 | ... | 9 | 13 | 17 | ... |
| 2 | ... | 10 | 14 | 18 | ... |
| 3 | ... | 11 | 15 | 19 | ... |
| 4 | ... | 8 | 12 | 16 | ... |
| 5 | ... | 9 | 13 | 17 | ... |
| 6 | ... | 10 | 14 | 18 | ... |
| 7 | ... | 11 | 15 | 19 | ... |

FIG. 6

| SLOT COUNT | | | | | | | | | | |
|---|---|---|---|---|---|---|---|---|---|---|
| | ⋮ | ⋮ | ⋮ | ⋮ | ⋮ | ⋮ | ⋮ | ⋮ | ⋮ | ⋮ |
| | 4 | 32 | 33 | 34 | 35 | 36 | 37 | 38 | 39 | |
| | 3 | 24 | 25 | 26 | 27 | 28 | 29 | 30 | 31 | |
| | 2 | 16 | 17 | 18 | 19 | 20 | 21 | 22 | 23 | |
| | ⋮ | ⋮ | ⋮ | ⋮ | ⋮ | ⋮ | ⋮ | ⋮ | ⋮ | |
| CYCLE COUNT | | 0 | 1 | 2 | 3 | 4 | 5 | 6 | 7 | |

SYSTEM AND METHOD FOR CREATING A SLOT TABLE ENTRY ADDRESS FOR A COMMUNICATIONS DEVICE

Embodiments of the invention relate generally to address systems and methods and, more particularly, to systems and methods for generating slot table entry addresses for communications devices.

Communications nodes in an application system can communicate with each other directly or through a communications hub device such as a communications controller. For example, a communications controller can connect communications nodes in an automobile system to control communications between the communications nodes in order to improve the robustness of communications of the automobile system. The communications nodes can perform a look up in a slot table using slot table entry addresses and check the corresponding slot table entries that contain communications schedule information. In addition, to control communications between the communications nodes in different time slots, the communications controller can perform a look up in a slot table using slot table entry addresses and check the corresponding slot table entries that contain communications configuration information of the communications nodes in the time slots.

Systems and methods for generating a slot table entry address for a communications device of a communications network are described. In one embodiment, a method for generating a slot table entry address for a communications device of a communications network includes processing a slot counter value according to a configuration setting value to produce a processed slot counter value, where the slot counter value identifies a time slot of data communications of the communications network, masking a cycle counter value according to the configuration setting value to generate a masked cycle counter value, where the cycle counter value identifies a communications cycle containing the time slot, and processing the processed slot counter value and the masked cycle counter value to generate a slot table entry address such that a corresponding slot table entry of the time slot of the communications cycle in a slot table is accessed by the communications device at the slot table entry address. Other embodiments are also described.

In one embodiment, a system for generating a slot table entry address for a communications device of a communications network includes a first bit processing device configured to process a slot counter value according to a configuration setting value to produce a processed slot counter value, where the slot counter value identifies a time slot of data communications of the communications network, a bit masking device configured to mask a cycle counter value according to the configuration setting value to generate a masked cycle counter value, where the cycle counter value identifies a communications cycle containing the time slot, and a second bit processing device configured to process the processed slot counter value and the masked cycle counter value to generate a slot table entry address such that a corresponding slot table entry of the time slot of the communications cycle in a slot table is accessed by the communications device at the slot table entry address.

In one embodiment, a method for generating a slot table entry address for a FlexRay-compatible communications device of a communications network includes processing a slot counter value according to a configuration setting value to produce a processed slot counter value, where the slot counter value identifies a time slot of data communications of the communications network, masking a cycle counter value according to the configuration setting value to generate a masked cycle counter value, where the cycle counter value identifies a communications cycle containing the time slot, and processing the processed slot counter value and the masked cycle counter value to generate a slot table entry address such that a corresponding slot table entry of the time slot of the communications cycle in a slot table is accessed by the FlexRay-compatible communications device at the slot table entry address.

Other aspects and advantages of embodiments of the present invention will become apparent from the following detailed description, taken in conjunction with the accompanying drawings, depicted by way of example of the principles of the invention.

Throughout the description, similar reference numbers may be used to identify similar elements.

It will be readily understood that the components of the embodiments as generally described herein and illustrated in the appended figures could be arranged and designed in a wide variety of different configurations. Thus, the following detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment. Rather, language referring to the features and advantages is understood to mean that a specific feature, advantage, or characteristic described in connection with an embodiment is included in at least one embodiment. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment. Thus, the phrases "in one embodiment," "in an embodiment," and similar language throughout this specification may, but do not necessarily, all refer to the same embodiment.

Figure 1:
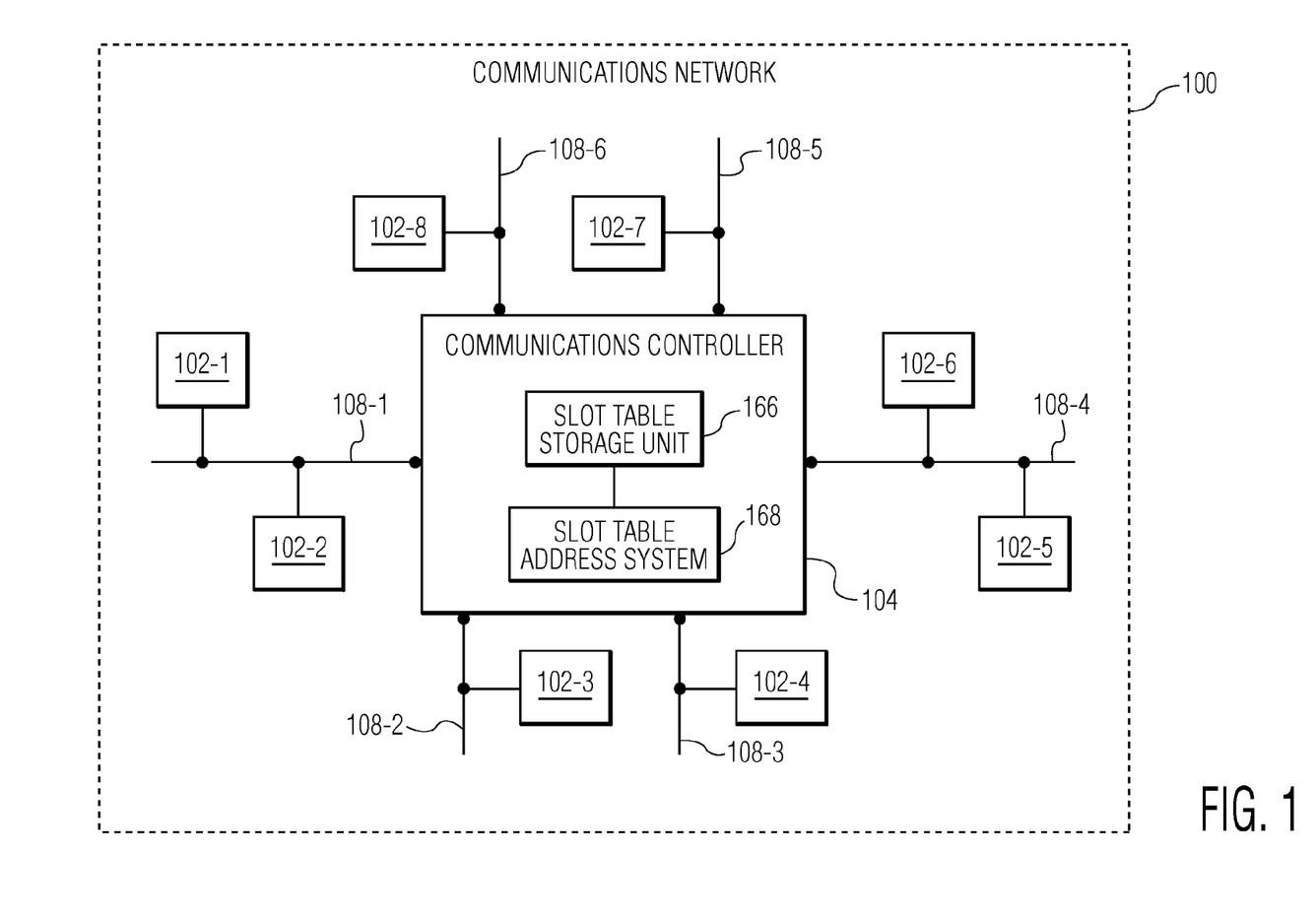
FIG. 1 is a schematic block diagram of a communications network in accordance with an embodiment of the invention.

FIG. 1 is a schematic block diagram of a communications network 100 in accordance with an embodiment of the invention. The communications network can be used for various applications. In an embodiment, the communications network is used for an automotive application. Examples of automotive applications include, without limitation, vehicle dynamics such as braking, suspension, steering, driver assistance, intelligent parking assist, adaptive cruise control, fuel control, traction control, intelligent power assisted steering, lane departure warning, electronic power assisted steering and electronic stability control. For example, the communications network facilitates communications among communications devices such as electronic controller nodes in an automobile system, which may be located within a single vehicle or distributed across multiple vehicles.

In the embodiment depicted in FIG. 1, the communications network 100 includes communications devices 102-1, 102-2, 102-3, 102-4, 102-5, 102-6, 102-7, 102-8 and a communications controller 104. The communications network is configured to facilitate communications among the communications devices. In an embodiment, the communications network is configured to facilitate critical communications (e.g., safety critical communications) among the communications devices. Although the communications network is shown in FIG. 1 as including eight communications devices, in some other embodiments, the communications network includes more than or less than eight communications devices. Although the communications network is shown in FIG. 1 as including only one communications controller, in some other embodiments, the communications network includes multiple communications controllers.

The communications devices 102-1, 102-2, 102-3, 102-4, 102-5, 102-6, 102-7, 102-8 of the communications network 100 are configured to transmit and receive data. The data transmitted and received by the communications devices can be in any suitable format. In an embodiment, the data transmitted and received are data frames. In an embodiment, a data frame includes a header segment, a payload segment used to convey application data, and a trailer segment. In addition to communications, each of the communications devices may be configured to perform an additional function. For example, each of the communications devices may be used to perform an automotive application. In an embodiment, the communications devices are electronic controller nodes in an automobile system. An electronic controller node contains an electronic control unit (ECU), which may be connected to sensors and actuators connected. The ECU typically collects data from the sensors, runs application software, controls the actuators, and communicates to other electronic controller nodes via the communications network.

The communications controller 104 of the communications network 100 is configured to control communications data transmitted on buses or branches in the communications network. In an embodiment, the communications controller 104 selectively block and selectively forward data received on different data transmission buses or branches in the communications network. In the embodiment depicted in FIG. 1, the communications controller 104 is connected to six buses 108-1, 108-2, 108-3, 108-4, 108-5, 108-6 in the communications network. Specifically, the communications devices 102-1, 102-2 are connected to the bus 108-1, the communications device 102-3 is connected to the bus 108-2, the communications device 102-4 is connected to the bus 108-3, the communications devices 102-5, 102-6 are connected to the bus 108-4, the communications device 102-7 is connected to the bus 108-5 and the communications device 102-8 is connected to the bus 108-6. In an embodiment, the six buses are serial communications buses in the communications network. The communications controller 104 may be a part of an In-Vehicle Network (IVN) system. Although the communications controller 104 is shown in FIG. 1 as being connected to six buses, in some other embodiments, the communications controller 104 is connected to more than or less than six buses. In an embodiment, at least one of the communications devices 102-1, 102-2, 102-3, 102-4, 102-5, 102-6, 102-7, 102-8 is directly connected to a bus in the communications network. In other words, at least one of the communications devices 102-1, 102-2, 102-3, 102-4, 102-5, 102-6, 102-7, 102-8 is connected to a bus in the communications network without any intermediate device. In an embodiment, the robustness of safety critical communications of an application system such as an automobile system can be improved by connecting communications devices 102-1, 102-2, 102-3, 102-4, 102-5, 102-6, 102-7, 102-8 in the application system to the communications controller 104. For example, the communications controller 104 can block unwanted communications in the automobile system and protect the safety critical communications.

In an embodiment, all of the communications devices 102-1, 102-2, 102-3, 102-4, 102-5, 102-6, 102-7, 102-8 are communications nodes of a FlexRay™ communications system in accordance to the FlexRay™ communications system specifications developed by the FlexRay™ Consortium. A FlexRay™ communications system is a robust, scalable, deterministic and fault-tolerant digital serial bus system for automotive applications. For example, a FlexRay™ communications system can be used by a car manufacturer to adopt an in-vehicle network (IVN) with high data communications speeds to accommodate advanced features in automobiles. In this embodiment, the communications controller 104 is connected to a channel of the FlexRay™ communications system to enable data transfer on the channel and to increase fault tolerance. A channel of the FlexRay™ communications system is a single communications medium, e.g., one network. For example, the FlexRay™ communications system specifications distinguish between two independent, parallel communications media, a channel A and a channel B. The CBG 104 may be a FlexRay-compatible CBG, which is designed, developed, manufactured, and/or configured compatibly with or in accordance to the FlexRay™ communications system specifications developed by the FlexRay™ Consortium. The communications controller 104 may be a FlexRay-compatible communications controller, which is designed, developed, manufactured, and/or configured compatibly with or in accordance to the FlexRay™ communications system specifications developed by the FlexRay™ Consortium. When the communications controller 104 is used to protect a channel of a FlexRay™ communications system, some critical faults (e.g., short circuited bus lines or erroneous behavior of a communications node) can be tolerated by the FlexRay™ communications system. The communications controller 104 can support a given number (e.g., 6) of buses in the communications network 100. In an embodiment, a sub-bus or other communications link/device is connected to a bus in the communications network and communications nodes that perform non-critical applications are connected to the sub-bus or the other communications link/device. For example, a gateway or a bridge can be used to connect the CBG 104 to a Local Interconnect Network (LIN) bus, a Controller Area Network (CAN) bus, or an Ethernet bus, which is connected to external communications devices. The LIN bus is a vehicle bus or a computer networking bus system used within automotive network architectures. The CAN bus is a vehicle bus designed to allow microcontrollers and devices to communicate with each other within a vehicle without a host computer. The number of nodes connected to a sub-bus is not limited by the communications controller 104. The architecture and algorithms of the communications controller 104 may be independent of the number of buses connected to the communications controller 104. In an embodiment, multiple communications controllers are cascaded on one channel of a FlexRay™ communications system. For example, if a single communications controller is not connected to a sufficient number of buses/branches for a certain FlexRay™ communications system, multiple communications controllers can be cascaded on one channel of the FlexRay™ communications system such that a sufficient number of buses are provided.

The communications controller 104 is further configured to store a communications schedule of the communications devices 102-1, 102-2, 102-3, 102-4, 102-5, 102-6, 102-7, 102-8 and configuration parameters. The communications schedule contains information of scheduled data traffic that goes through the communications controller 104. The communications controller 104 controls communications data received on the buses 108-1, 108-2, 108-3, 108-4, 108-5, 108-6 connected to the communications controller 104 based on the communications schedule and/or the configuration parameters. In an embodiment, the communications controller 104 selectively blocks and selectively forwards data received on the buses 108-1, 108-2, 108-3, 108-4, 108-5, 108-6 connected to the communications controller 104 based on the communications schedule and/or the configuration parameters. The communications controller 104 may not store the complete communications schedule of the communications network 100. The communications controller 104 at least stores bus level communications schedule for data communications that goes through the communications controller 104. However, the communications controller 104 may also store more information, e.g., node level communications schedule, of data communications that may or may not go through the communications controller 104. In an embodiment, the communications controller 104 has information to protect data (e.g., a data frame or data frames) relevant to critical functions and to start up and maintain communications. In an embodiment, if only a subset of the communications devices and messages are used to fulfill a critical function, only the schedule of the subset of the communications devices and messages may be stored in the communications controller and only the time slot/bus combinations of the subset of the communications devices and messages are protected. A time slot may be a slot in a static segment of a FlexRay-compatible communications cycle or a mini-slot in a dynamic segment of a FlexRay-compatible communications cycle. As a result, a change in a communications device performing a non-critical function will not lead to a change in the communications schedule stored in the communications controller 104.

In an embodiment, the communications controller 104 is configured to decode data (e.g., a data frame or data frames). The communications controller 104 can also filter received data frames. Examples of filtering functions that can be performed by the communications controller includes, without limitation, semantic filtering and Byzantine (SOS) filtering. By filtering received data frames, the communications controller 104 operates to ensure that certain errors on one bus will not propagate to other buses. Because the communications controller 104 is separated from the communications devices 102-1, 102-2, 102-3, 102-4, 102-5, 102-6, 102-7, 102-8, errors in the communications devices will not harm the communications controller. Data such as a data frame that is identified as faulty by the communications controller 104 may be invalidated in such a way that all of the communications devices will detect the data as being faulty. The communications controller 104 can prevent the formation of cliques on one channel during startup and normal operation by not-forwarding or invalidating frames which are identified as being faulty (e.g., with wrong frame ID or cycle count). The communications controller 104 can protect the startup of a FlexRay™ communications system in the presence of faults. In addition, the communications controller 104 can significantly enhance the fault tolerance of the FlexRay™ system especially during startup. For example, the communications controller 104 can limit the bandwidth assigned to a certain communications device or a bus connected to the communications controller 104.

Figure 2:
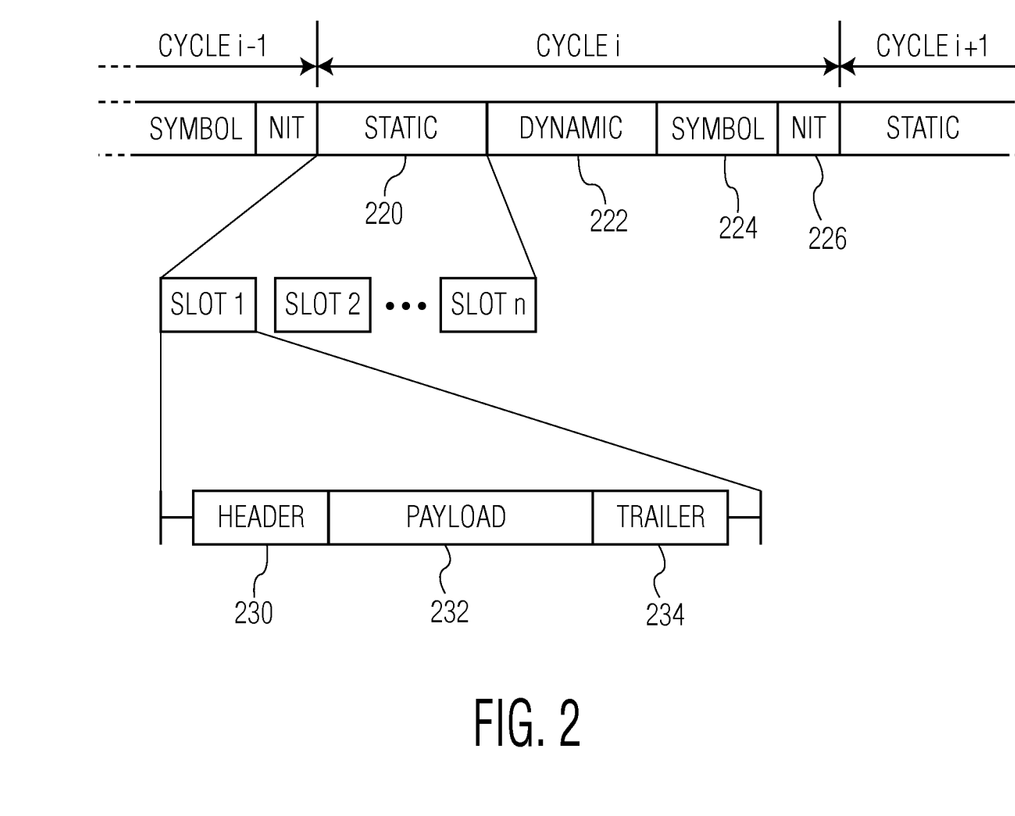
FIG. 2 illustrates an exemplary access diagram of the communications network depicted in FIG. 1.

In an embodiment, access to the communications network 100 is partitioned, divided, or grouped into consecutive communications cycles. FIG. 2 illustrates an exemplary access diagram of the communications network depicted in FIG. 1. As shown in FIG. 2, the communications network is accessed through at least three communications cycles, which include cycle "i−1," cycle "i" and cycle "i+1," where i is an integer that is larger than 0. Each cycle includes a static segment, an optional dynamic segment, an optional symbol window and a network idle time (NIT) interval. The static segment is divided into static slots and the dynamic segment is divided into mini-slots. In an embodiment, in each static slot/mini-slot, a communications device 102-1, 102-2, 102-3, 102-4, 102-5, 102-6, 102-7, or 102-8, which may be a communications node in a FlexRay™ IVN, can send one data frame through the communications controller 104 to one or more communications devices 102-1, 102-2, 102-3, 102-4, 102-5, 102-6, 102-7, or 102-8, which may be one or more communications nodes in the FlexRay™ IVN. In the embodiment depicted in FIG. 2, cycle i includes a static segment 220, a dynamic segment 222, a symbol window 224 and a NIT interval 226. In an embodiment, the static segment 220 is used to send critical, real-time data, and is divided into static slots, in which the electronic control units (ECUs) can send a frame on the bus. In an embodiment, the dynamic segment 222 enables event-triggered communications. The lengths of the mini-slots in the dynamic segment depend on whether or not an ECU sends data. In an embodiment, the symbol window 224 is used to transmit special symbols, for example, special symbols to start up a FlexRay cluster. In an embodiment, the NIT interval 226 is used by the communications devices 102-1, 102-2, 102-3, 102-4, 102-5, 102-6, 102-7, 102-8 to allow them to correct their local time bases in order to stay synchronized to each other. The static segment 220 is divided into slots 1 . . . n, where n is an integer that is larger than two. Each of the slots 1 . . . n is used to transmit a data frame, which includes a header segment, a payload segment used to convey application data and a trailer segment. For example, slot 1 is used to transmit a data frame that includes a header segment 230, a payload segment 232 and a trailer segment 234. In an embodiment, all slots of the static segment have identical size. For example, all slots of the static segment in a FlexRay™ system will have identical size. A single communications device may use more than one slot.

Any communications node of the communications network 100, which can be the centralized communications controller 104, or one of the local communications nodes 102-1, 102-2, 102-3, 102-4, 102-5, 102-6, 102-7, 102-8, can use slot table information to determine what action to take for a particular time slot/cycle combination. Specifically, any communications node of the communications network may check a slot table to determine whether to send data (e.g., a message), receive data, selectively forward data, or selectively block data in a particular time slot/cycle combination. For example, the communications devices 102-1, 102-2, 102-3, 102-4, 102-5, 102-6, 102-7, 102-8 of the communications network 100 can perform a look up in a slot table using slot table entry addresses and check the corresponding slot table entries that contain communications schedule information to determine whether to send data (e.g., a message) and/or receive data. In addition, to control communications between the communications devices 102-1, 102-2, 102-3, 102-4, 102-5, 102-6, 102-7, 102-8 connected to the buses 108-1, 108-2, 108-3, 108-4, 108-5, 108-6 in different time slots, the communications controller 104 can look up slot table entries in a slot table using slot table entry addresses and check the corresponding slot table entries that contains communications configuration information of the buses 108-1, 108-2, 108-3, 108-4, 108-5, 108-6 in the time slots to determine whether to selectively forward data and/or selectively block data. A time slot for data communications between the communications devices 102-1, 102-2, 102-3, 102-4, 102-5, 102-6, 102-7, 102-8 of the communications network 100 through the communications controller 104 may be a slot of a static segment of a communications cycle or a mini-slot of a dynamic segment of a communications cycle, a symbol window, or a NIT interval. In the embodiment depicted in FIG. 1, the communications controller 104 includes a slot table storage unit 166 and a slot table address system 168.

The slot table storage unit 166 is configured to store at least one slot table that includes one or more slot table entries. The slot table storage unit 166 may be a semiconductor memory or a solid state memory. In an embodiment, the slot table storage unit 166 is implemented as a non-volatile memory such as a read-only memory (ROM). Information stored in a slot table entry can be encoded in various encoding schemes. The slot table address system 168 is configured to generate a slot table entry address for accessing a slot table entry of a slot table stored in the slot table storage unit 166. In an embodiment, at least one of the communications devices 102-1, 102-2, 102-3, 102-4, 102-5, 102-6, 102-7, 102-8 of the communications network 100 looks up a slot table entry stored in the slot table storage unit 166 to determine what operation to perform in each time slot (e.g., each slot/mini-slot of each static/dynamic segment of a communications cycle). For example, a communications device may look up a slot table entry stored in the slot table storage unit 166 for a time slot to send data and/or receive data in the time slot according to the slot table entry. In another embodiment, the communications controller 104 looks up a slot table entry stored in the slot table storage unit 166 to determine what operation to perform in each time slot (e.g., each slot/mini-slot of each static/dynamic segment of a communications cycle). For example, the communications controller 104 may look up a slot table entry stored in the slot table storage unit 166 for a time slot to forward received data and/or block received data in the time slot according to the slot table entry. Although the slot table address system 168 and the slot table storage unit 166 are shown in FIG. 1 as separate units, in some other embodiments, the slot table address system 168 and the slot table storage unit 166 are integrated in a single unit. In addition, although the slot table address system 168 and the slot table storage unit 166 are shown in FIG. 1 as being located inside the communications controller 104 and being a part of the communications controller 104, in some other embodiments, at least one of the slot table address system 168 and the slot table storage unit 166 is located external to the communications controller 104 and is not a part of the communications controller 104. In an embodiment, at least one of the slot table address system 168 and the slot table storage unit 166 may be located within one of the communications devices 102-1, 102-2, 102-3, 102-4, 102-5, 102-6, 102-7, 102-8 of the communications network 100. In another embodiment, at least one of the slot table address system 168 and the slot table storage unit 166 may be located external to the communications devices 102-1, 102-2, 102-3, 102-4, 102-5, 102-6, 102-7, 102-8 of the communications network 100 and the communications controller 104. Furthermore, although the slot table address system 168 is shown in FIG. 1 as being directly connected to the slot table storage unit 166, in some other embodiments, at least one intermediate device is located between the slot table address system 168 and the slot table storage unit 166.

The slot table address system 168 enables the communications controller 104 to provide seamless support for cycle multiplexing. Cycle multiplexing means using different communications schedules in different communications cycles. For example, the communications controller 104 can provide seamless support for cycle multiplexing in FlexRay™ protocol engines. A FlexRay™ protocol engine is an essential part of the communications controller 104. A FlexRay™ protocol engine keeps track of the progress of the FlexRay™ communications protocol, i.e., in which time slot and communications cycle the communications network 100 is currently operating. The FlexRay™ protocol engine can also perform checks and validation of the protocol and check whether communications devices connected to the communications controller 104 conform to the protocol. Specifically, the slot table address system 168 provides an efficient and effective addressing scheme for accessing entries in slot tables that are used by, for example, FlexRay™ protocol engines. For example, the slot table address system 168 may utilize a configurable number of bits from the FlexRay™ cycle counter in combination with a configurable number of bits the FlexRay™ slot counter to generate a slot table entry address that can be used to access an entry in a FlexRay™ communications schedule slot table. A device or an end user such as a human operator can exchange bits that are used to specify the static/dynamic slot count with bits that are used to specify the communications cycle count. The slot table address system 168 can offer more flexibility to a device or an end user to configure the data communications across the communications network 100 or permit the same functionality to be implemented while using less silicon area to implement the slot table (i.e., on-chip or off-chip memory) and/or consuming less power and computation time to determine which action needs to take place in which time slot and in which communications cycle.

In an exemplary operation of the communications network 100, the slot table address system 168 generates a slot table entry address for locating a slot table entry for a particular time slot of a particular communications cycle of data communications between the communications devices 102-1, 102-2, 102-3, 102-4, 102-5, 102-6, 102-7, 102-8 of the communications network through the communications controller 104. A communications device may locate the corresponding slot table entry for the particular time slot to send data and/or receive data in the particular time slot based on the located slot table entry. The communications controller 104 may locate the corresponding slot table entry for the particular time slot of the particular communications cycle to selectively block and selectively forward data received in the particular time slot of the particular communications cycle based on the located slot table entry.

Slot number, base communications cycle, and cycle repetition count of each data frame can be stored in a slot table and be used to determine data forward behavior of the communications controller 104 in a particular communications cycle and in a particular slot. However, there are multiple disadvantages associated with storing the slot number, the base communications cycle, and the cycle repetition count of each data frame in a slot table. For example, multiple entries can exist for a particular time slot in the slot table as long as the entries are sent or received in the different communications cycles. The entire communications network 100 is always in a single communication cycle/slot/window, or in a static segment 220, a dynamic segment 222, a symbol window 224 and a NIT interval 226. When multiple entries exist for a particular time slot in the slot table, the communications controller 104 has to read at least two (but potentially up to sixty four) slot table entries for a given slot number, before being able to determine which of these entries define what should happen for this particular cycle/slot combination. Although the slot table entries reading process can be somewhat optimized by sorting the entries in the slot table, the reading of multiple entries from the slot table is still time and power consuming. In another example, it is possible to simply concatenate the slot counter and the cycle counter and use this concatenated combination as the overall address in the slot table. However, in a scenario that a device or an end-user may be permitted to specify up to 2048 ($2^{11}$) slots in a single communications cycle and may be permitted to use 64 ($2^6$) different communications cycles, a slot table with 131,072 entries ($2^{11} \times 2^6 = 2^{17}$) requires an address space of at least 17 bits, not considering the size of each slot table entry. Because the slot table is usually stored in or close to the communications controller 104, the memory size of the communications controller 104 would have to be large in order to accommodate such addressing of the slot table entries. The large memory size of the communications controller 104 can result in a high manufacturing and testing cost, which reduces the market competiveness of the communications controller 104. Compared to the approach of storing the slot number, the base communications cycle, and the cycle repetition count of each data frame in a slot table and the approach of simply concatenating the slot counter and the cycle counter into a slot table entry address in the slot table, the slot table address system 168 can efficiently and effectively use the scarce memory resources. Specifically, the slot table address system 168 allows an end user to configure how many bits are used to indicate the communications cycle and how many are used to indicate the slot. Because the numbers of bits that are used to indicate the communications cycle and the slot can be configured, more effective usage can be made of scarce memory resources in the communications controller 104, which may be a FlexRay device. Additionally, by changing the way in which entries are retrieved from the slot table, power consumption and computation time are reduced significantly as well, as the communications controller can instead directly use the address generated by the slot table address system 168 to look up the correct entry, and does not need multiple iterations involving multiple slot table entries. Finally, because the number of bits to representing a slot table entry address can be reduced, the memory size of the communications controllers can be reduced and the manufacturing cost of the communications controller 104 can be lowered. In an embodiment, the slot table address system 168 can be combined with the required FlexRay™ transceiver functionality on a single die or in a single package.

Figure 3:
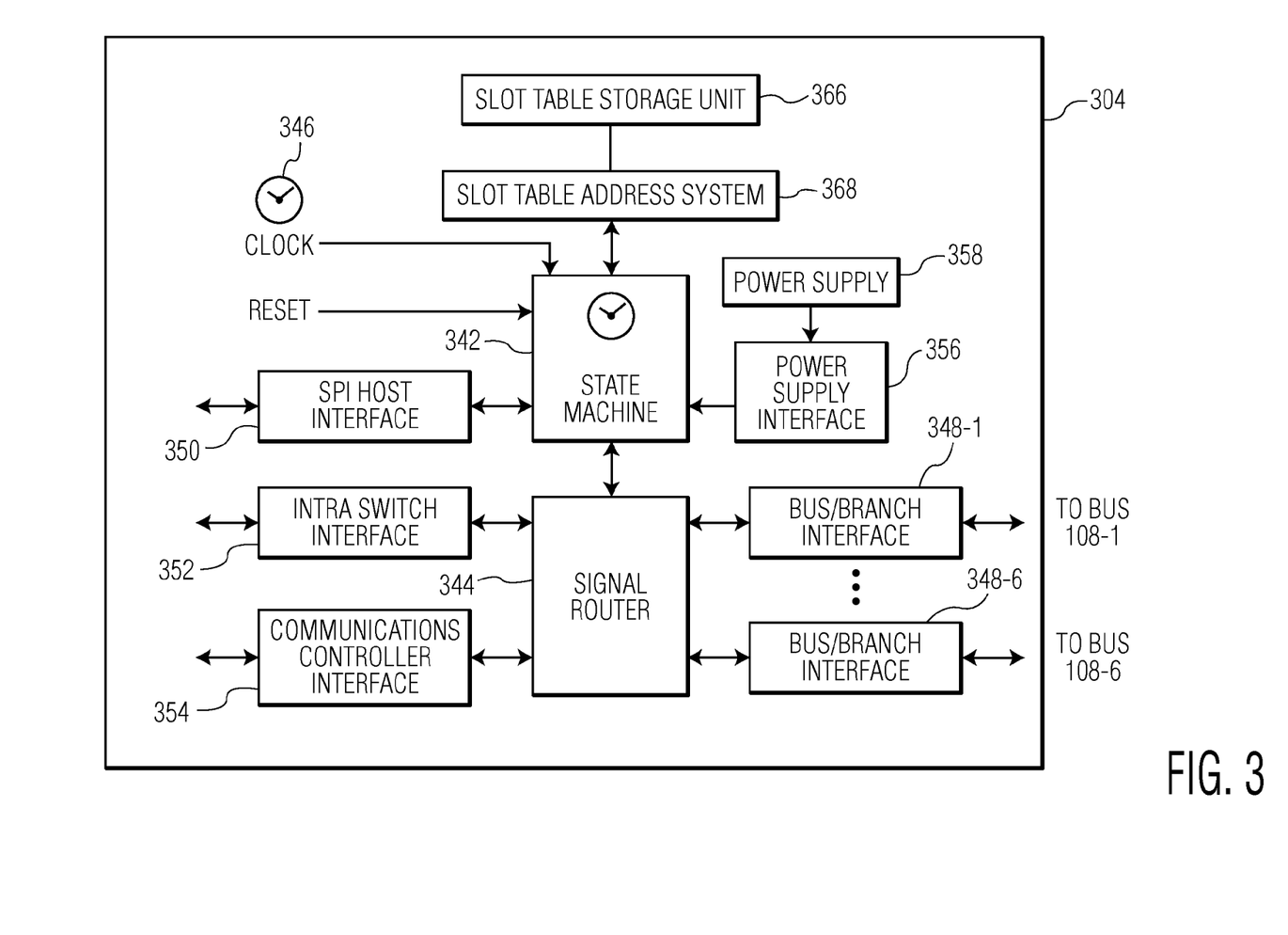
FIG. 3 depicts an embodiment of the communications controller depicted in FIG. 1 that is implemented as a switch.

The communications controller 104 may be implemented as a switch (e.g., a FlexRay™ switch) or a CBG (e.g., a FlexRay™ CBG), which are described below. Compared to a CBG, a switch may not need to know from which bus 108-1, 108-2, 108-3, 108-4, 108-5, or 108-6 data (e.g., a data frame or data frames) is received. FIG. 3 depicts an embodiment of the communications controller 104 depicted in FIG. 1 that is implemented as a switch 304. The switch may be a FlexRay-compatible switch, which is designed, developed, manufactured, and/or configured compatibly with or in accordance to the FlexRay™ communications system specifications developed by the FlexRay™ Consortium. In an embodiment, the switch is similar to or the same as the FlexRay™ switch described in P. Milbredt, B. Vermeulen, G. Tabanoglu and M. Lukasiewycz, "Switched FlexRay: Increasing the effective bandwidth and safety of FlexRay networks," in Proceeding of IEEE Conference Emerging Technologies and Factory Automation (ETFA), pages 1-8, 2010. The switch is one of possible implementations of the communications controller 104. However, the communications controller 104 can be implemented differently from the switch depicted in FIG. 3. The invention is not restricted to the particular implementation of the switch depicted in FIG. 3.

In the embodiment depicted in FIG. 3, the switch 304 includes a slot table storage unit 366, a slot table address system 368, a state machine 342, a signal router 344, a clock 346, bus/branch interfaces 348-1 . . . 348-6, a Serial Peripheral Interface (SPI) host interface 350, an intra switch interface 352, a communications controller interface 354, a power supply interface 356 and a power supply 358. Although the clock 346 and the power supply 358 are shown in FIG. 3 as being parts of the switch, in some other embodiments, at least one of the clock 346 and the power supply 358 is not a part of the switch.

In the embodiment depicted in FIG. 3, the slot table storage unit 366 performs functions similar to or same as the slot table storage unit 166 depicted in FIG. 1 and the slot table address system 368 performs functions similar to or same as the slot table address system 168 depicted in FIG. 1. Although the slot table address system 368 and the slot table storage unit 366 are shown in FIG. 3 as separate units, in some other embodiments, the slot table address system 368 and the slot table storage unit 366 are integrated in a single unit. In addition, although the slot table address system 368 and the slot table storage unit 366 are shown in FIG. 3 as being located inside the switch and being a part of the switch, in some other embodiments, at least one of the slot table address system 368 and the slot table storage unit 366 is located external to the switch and is not a part of the switch. In an embodiment, at least one of the slot table address system 368 and the slot table storage unit 366 may be located within one of the communications devices 102-1, 102-2, 102-3, 102-4, 102-5, 102-6, 102-7, 102-8 of the communications network 100. In another embodiment, at least one of the slot table address system 368 and the slot table storage unit 366 may be located external to the communications devices 102-1, 102-2, 102-3, 102-4, 102-5, 102-6, 102-7, 102-8 of the communications network 100 and the communications controller 104. Furthermore, although the slot table address system 368 is shown in FIG. 3 as being directly connected to the slot table storage unit 366, in some other embodiments, at least one intermediate device is located between the slot table address system 368 and the slot table storage unit 366.

The state machine 342 is configured to keep track of the time slots to determine the current time slot of the communications network 100. In the embodiment depicted in FIG. 3, the state machine 342 configures the signal router 344 based on the data switching information in the slot table stored in the slot table storage unit 366 using an address from the slot table address system 368. In an embodiment, for each time slot, the state machine 342 retrieves a slot table entry stored at an address in the slot table storage unit 366 that is provided by the slot table address system 368 and uses data in the slot table entry to control the data forwarding in the time slot. The signal router is configured to perform data switching between the buses 108-1, 108-2, 108-3, 108-4, 108-5, 108-6 connected to the switch 304. In an embodiment, the slot table address system 368 is a part of the state machine 342.

The clock 346 is configured to provide one or more clock signals to the state machine 342. The bus/branch interfaces 348-1 . . . 348-6 are connected to the buses 108-1, 108-2, 108-3, 108-4, 108-5, 108-6, respectively. The bus/branch interfaces are configured to receive data from one or more of the buses 108-1, 108-2, 108-3, 108-4, 108-5, 108-6 connected to the switch 304 and to send the data to one or more of the buses 108-1, 108-2, 108-3, 108-4, 108-5, 108-6.

The SPI host interface 350 can be used by a local host to configure the switch 304. The intra switch interface 352 is configured to cascade switches to support more buses than a single switch can support. The communications controller interface 354 is configured to allow a local host to communicate to the buses 108-1, 108-2, 108-3, 108-4, 108-5, 108-6 through the switch.

The power supply interface 356 is connected to the power supply 358 and the state machine 342. The power supply interface acts as an interface between the power supply and the switch 304. The power supply is configured to provide power to the switch.

In an embodiment, the signal router 344 forwards data from one or more buses 108-1, 108-2, 108-3, 108-4, 108-5, or 108-6 connected to the switch 304 to one or more other buses 108-1, 108-2, 108-3, 108-4, 108-5, or 108-6 connected to the switch under control of the internal state machine 342. For each slot, the state machine retrieves a slot table entry stored in the slot table stored in the slot table storage unit 366 using an address from the slot table address system 368 and uses data in the slot table entry to configure the signal router to control the data forwarding in the slot.

Figure 4:
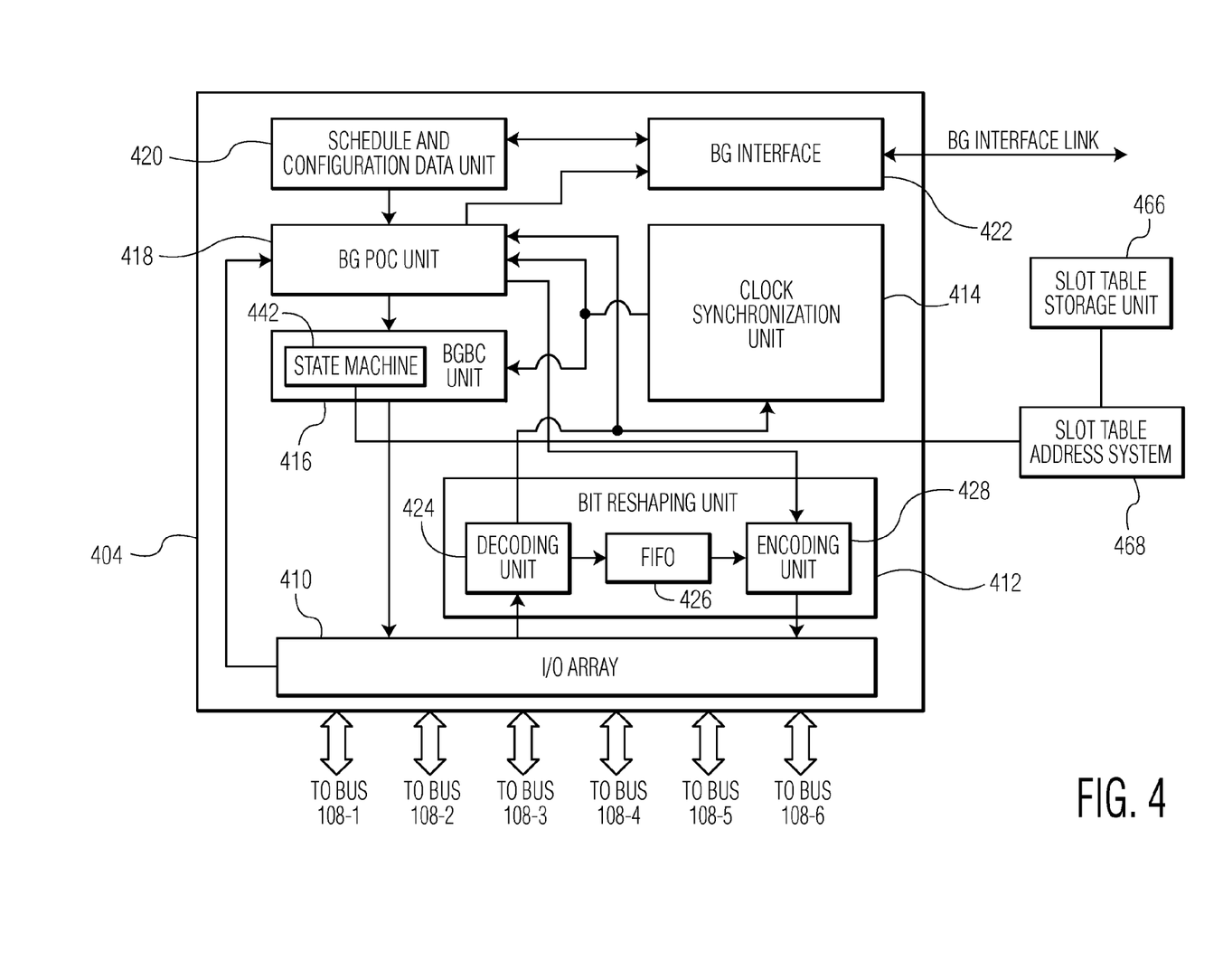
FIG. 4 depicts an embodiment of the communications controller depicted in FIG. 1 that is implemented as a central bus guardian (CBG).

FIG. 4 depicts an embodiment of the communications controller 104 depicted in FIG. 1 that is implemented as a CBG 404. The CBG may be a FlexRay-compatible CBG, which is designed, developed, manufactured, and/or configured compatibly with or in accordance to the FlexRay™ communications system specifications developed by the FlexRay™ Consortium. In the embodiment depicted in FIG. 4, the CBG includes an input/output (I/O) array 410, a bit reshaping unit 412, a clock synchronization unit 414, a bus guardian branch control (BGBC) unit 416, a bus guardian (BG) Protocol Operation Control (BG POC) unit 418, a schedule and configuration data unit 420 and a BG Interface 422. The CBG is one of possible implementations of the communications controller 104. However, the communications controller 104 can be implemented differently from the CBG depicted in FIG. 4. The invention is not restricted to the particular implementation of the CBG depicted in FIG. 4.

The I/O array 410 of the CBG 404 is configured to connect to all of the buses 108-1, 108-2, 108-3, 108-4, 108-5, 108-6 connected to the CBG. In an embodiment, incoming data (e.g., an incoming data frame) received by the I/O array from one bus connected to the CBG is forwarded to the bit reshaping unit 412 before the incoming data is forwarded to the other buses connected to the CBG. The I/O array may allow only one bus to receive a communications element at a given point in time. If the CBG allows race arbitration in which the first incoming data frame from one bus will be delivered to all other buses, during the transmission of the first incoming data frame, no data frame from another bus can be received by the I/O array.

The bit reshaping unit 412 of the CBG 404 operates to ensure that, independent of the input signal quality, the output signal delivers the same decoding results for all receiving devices. If the decoded data (e.g., a decoded data frame) is correct, all non-faulty communications devices will receive the correct data. If the decoded data is incorrect, all non-faulty communications devices will receive the incorrect data. The output stream of the bit reshaping unit is generated using the clock of the CBG.

In the embodiment depicted in FIG. 4, the bit reshaping unit 412 includes a decoding unit 424, a First in First out (FIFO) buffer 426 and an encoding unit 428. The decoding unit of the bit reshaping unit is configured to decode received data (e.g., a received data frame) from the I/O array 410 and to deliver the data and relevant timing and status information to the clock synchronization unit 414 and the BG POC unit 418. The status information contains the information on whether data was received, whether a startup or a sync data frame was received, and error information. In an embodiment, the decoding unit verifies the conformance of an incoming bit-stream to the coding rules and the general rules of communications elements. If the decoding unit finds an error in the incoming bitstream, the BG POC unit or other component of the CBG may stop the current relay process and change (e.g., truncate or enlarge) the bit stream to invalidate the bitstream.

The FIFO buffer 426 of the bit reshaping unit 412 is configured to store data (e.g., data bits) that is transferred from the decoding unit 424 to the encoding unit 428. Because the clock of a data sender and the clock of the CBG 404 may run at slightly different speeds, the number of bits stored within the FIFO buffer can increase or decrease during data transmission (e.g., transmission of a data frame). The size of the FIFO buffer typically has to be twice the size that would be required for the nominal delay of the bit reshaping unit due to the possible increase or decrease of stored bits during forwarding of a data frame.

The encoding unit 428 of the bit reshaping unit 412 is configured to encode data received and to deliver the encoded data (e.g., bitstream or symbols) to the I/O array 410. In an embodiment, the BG POC unit overrules data and forces the encoding unit to output an invalidated communications element. Due to possible clock deviations between a data sender and the CBG, the bit reshaping unit introduces an additional propagation delay, depending on maximal frame length and maximal relative clock deviation. The propagation delay can be reduced and the FIFO buffer minimized by allowing the encoding unit to compensate the clock speed difference, for example, by slightly varying the length of the high-bit in the byte start sequences of the data frame.

The clock synchronization unit 414 of the CBG 404 is configured to synchronize the CBG to the global time. Errors of the clock synchronization process are signaled from the clock synchronization unit to the BG POC unit 418. In an embodiment, the clock synchronization unit is basically identical to a clock synchronization unit in one of the communications devices 102-1, 102-2, 102-3, 102-4, 102-5, 102-6, 102-7, 102-8.

The BGBC unit 416 of the CBG 404 is configured to enforce a correct transmission schedule by opening the correct buses connected to the CBG for transmission at the correct time. In an embodiment, the BGBC unit operates such that the CBG behaves as an inactive device in which all of the buses connected to the CBG are used for input and none of the buses is used to output. In another embodiment, the BGBC unit operates to forward data received from one of the buses to all other buses.

In the embodiment depicted in FIG. 4, a slot table storage unit 466 and a slot table address system 468 are located external to the CBG 404. In an embodiment, at least one of the slot table address system 468 and the slot table storage unit 466 may be located external to the communications devices 102-1, 102-2, 102-3, 102-4, 102-5, 102-6, 102-7, 102-8 of the communications network 100 and the CBG 404. The slot table storage unit 466 performs functions similar to or same as the slot table storage unit 166 depicted in FIG. 1 and the slot table address system 468 performs functions similar to or same as the slot table address system 168 depicted in FIG. 1. Although the slot table address system 468 and the slot table storage unit 466 are shown in FIG. 4 as separate units, in some other embodiments, the slot table address system 468 and the slot table storage unit 466 are integrated in a single unit. In addition, although the slot table address system 468 and the slot table storage unit 466 are shown in FIG. 4 as being located outside the CBG and not being a part of the CBG, in some other embodiments, at least one of the slot table address system 468 and the slot table storage unit 466 is located inside the CBG and is a part of the CBG. In an embodiment, at least one of the slot table address system 468 and the slot table storage unit 466 may be located within one of the communications devices 102-1, 102-2, 102-3, 102-4, 102-5, 102-6, 102-7, 102-8 of the communications network 100. Furthermore, although the slot table address system 468 is shown in FIG. 4 as being directly connected to the slot table storage unit 466, in some other embodiments, at least one intermediate device is located between the slot table address system 468 and the slot table storage unit 466.

In the embodiment depicted in FIG. 4, the BGBC unit 416 includes a state machine 442 that performs functions similar to or same as the state machine 342 depicted in FIG. 3. Specifically, the state machine 442 is configured to keep track of the time slots to determine the current time slot of the communications network 100. In the embodiment depicted in FIG. 4, the state machine 442 is configured to perform data switching between communications device 102-1, 102-2, 102-3, 102-4, 102-5, 102-6, 102-7, 102-8 on the buses 108-1, 108-2, 108-3, 108-4, 108-5, 108-6 connected to the CBG 404 according to the slot table stored in the slot table storage unit 466 using an address from the slot table address system 468. In an embodiment, for each time slot, the state machine 442 retrieves a slot table entry stored in the slot table storage unit 466 using an address from the slot table address system 468 and uses data in the slot table entry to control the data forwarding in the time slot.

The BG POC unit 418 of the CBG 404 is configured to handle the different states (e.g., startup and normal operation, etc.) of the CBG and the transitions between the different states. In addition, the BG POC unit is also configured to enforce the schedule by sending the appropriate commands to the BGBC unit 416. All detected errors are stored by the BG POC unit and are made available to external devices through the BG Interface 422. The BG POC unit may have filtering capability. For example, if the decoding unit 424 finds an error in the incoming bitstream, the BG POC unit may stop the current relay process and truncate (or enlarge) the communications element to invalidate the communications element.

The schedule and configuration data unit 420 of the CBG 404 is configured to store the communications schedule (or at least the parts that need to be protected) and all necessary configuration data and to makes the stored information available to the BG POC unit 418. The integrity of the communications schedule and configuration data can be protected by an error-detecting code (e.g., a CRC) that is checked periodically. Mismatches between the data and an error-detecting code cause the CBG to transit into a state in which no communications elements are forwarded.

The BG Interface 422 of the CBG 404 is an optional connection device that allows an external computing unit (e.g., a central processing unit (CPU)) to perform certain operations involving the CBG. In an embodiment, the BG Interface is connected to a BG interface link and provides the possibility for an external device to update the communications schedule and configuration data of the CBG. The BG interface also allows error messages, status information and configuration data to be read out of the CBG. In an embodiment, the BG Interface 222 is connected to a gateway via a BG interface link and the gateway is connected to an external network.

Figure 5:
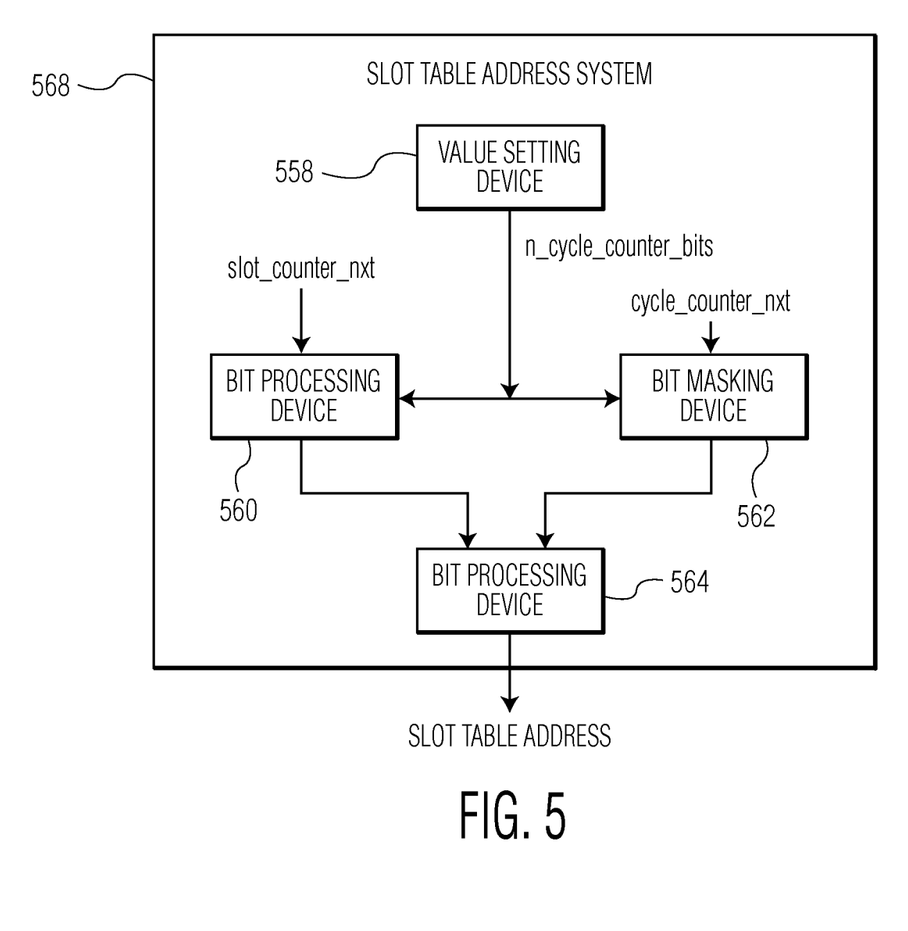
FIG. 5 depicts an embodiment of the slot table address system depicted in FIG. 1, 3 or 4.

FIG. 5 depicts an embodiment of the slot table address system 168, 368 or 468 depicted in FIG. 1, 3 or 4. In the embodiment depicted in FIG. 5, a slot table address system 568 includes a bit processing device 560, a bit masking device 562, a bit processing device 564 and a value setting device 558. At least one of the bit processing device 560, the bit masking device, the bit processing device 564 and the value setting device 558 may include hardware such as one or more processors and/or software stored in a non-transitory computer-readable medium such as one or more memory circuits. The slot table address system 568 can allow a seamless exchange between bits that are used to specify a slot counter and bits that are used to specify a communications cycle.

The slot table address system 568 takes in three input values, which include a slot counter value "slot_counter_nxt," a cycle counter value "cycle_counter_nxt," and a configuration setting value "n_cycle_counter_bits," and generates a slot table entry address. In the embodiment depicted in FIG. 5, the slot counter value is inputted into the bit processing device 560, the cycle counter value is inputted into the bit masking device 562, and the configuration setting value is inputted into the bit processing device 560 and the bit masking device 562. These three input values are generated by hardware such as dedicated logic, one or more processors and/or software stored in a non-transitory computer-readable medium such as one or more memory circuits. For example, the state machines 342, 442 may generate these three input values. In an embodiment, the slot table address system 568 keeps tracks of three input values from the external entities. In an embodiment, the slot counter value identifies or represents a time slot (e.g., a current time slot) of data communications between the communications nodes 102-1, 102-2, 102-3, 102-4, 102-5, 102-6, 102-7, 102-8, 104, of the communications network 100. For example, the slot counter value identifies or represents a time slot (e.g., a current time slot) of data communications between the communications nodes 102-1, 102-2, 102-3, 102-4, 102-5, 102-6, 102-7, 102-8, 104, of the communications network 100 through the communications controller 104, the switch 304 or the CBG 404. In an embodiment, the cycle counter value identifies or represents a communications cycle containing the time slot. The generated slot table entry address is directly or indirectly used to locate a slot table entry of a slot table stored in the slot table storage unit 166, 366 or 466 depicted in FIG. 1, 3 or 4. In an embodiment, the slot counter value has eleven bits, the cycle counter value has seven bits, and the slot table address has up to seventeen bits. The configuration setting value specifies how many bits of the cycle counter value are used for the least significant bits in the slot table entry address. The remainder of the slot table entry address may be formed by performing a logically OR action on the appropriate number of shifted slot counter bits.

The bit processing device 560 of the slot table address system 568 is configured to process the slot counter value according to the configuration setting value to produce a processed slot counter value. In an embodiment, the bit processing device 560 is a bit shifting device configured to shift the slot counter value according to the configuration setting value to produce a shifted slot counter value. In an embodiment, the bit shifting device is further configured to shift the slot counter value in the direction from least significant bits to most significant bits according to the configuration setting value to produce the shifted slot counter value. In other words, the bit shifting device is further configured to shift the slot counter value left according to the configuration setting value to produce the shifted slot counter value. The operation of shift-left is mathematically equivalent to a multiplication by the appropriate power of two. That is, shifting left by a certain amount s is mathematically equivalent to multiplying with a certain power of two. The bit processing device 560 can perform a shift operation such as shift-left operation, a mathematically equivalent multiplication operation, and any combination of a shift operation and a multiplication operation to produce the desired result. The bit masking device 562 of the slot table address system 568 is configured to mask the cycle counter value according to the configuration setting value to generate a masked cycle counter value. Although the bit processing device 560 and the bit masking device operate according to the same configuration setting value in the embodiment depicted in FIG. 5, in some other embodiment, the bit processing device 560 and the bit masking device may operate according to different configuration setting values.

The bit processing device 564 of the slot table address system 568 is configured to process the processed slot counter value (e.g., shifted slot counter value) from the bit processing device 560 and the masked cycle counter value from the bit masking device to generate a slot table entry address. In an embodiment, the bit processing device 564 is an OR logic circuit configured to perform an logic OR operation on the processed (e.g., shifted) slot counter value from the bit processing device 560 and the masked cycle counter value from the bit masking device to generate a slot table entry address. The logical-OR operation is mathematically equivalent to an addition operation. When the bits being shifted are zero, the logical OR operation is mathematically equivalent to an addition as there is no risk of a carry overflow when adding the least significant bits together since one of the operand is zero. The bit processing device 564 can perform a logical OR operation, a mathematically equivalent addition operation, and any combination of a logical OR operation and an addition operation to produce the desired result. Compared with other operations, the slot table address system 568 that combines the "shift left" and "logical-OR" operations is the most area efficient.

In the embodiment depicted in FIG. 5, the slot table address system 568 also includes a value setting device 558 configured to set the configuration setting value such that the number of bits of the slot counter value that are used in a slot table entry address and the number of bits of the cycle counter value that are used in the slot table entry address are specified. The value setting device may contain an interface to set the configuration setting value. By configuring the slot table address system 568 using the configuration setting value, a device or an end-user such as a human operator can trade-off the maximum number of addressable slots (i.e., the number of slot counter bits to use) against the accessible number of communications cycles (i.e., the number of cycle counter bits to use) in a slot table entry address. In an embodiment, the value setting device is further configured to set the configuration setting value such that the number of bits of the cycle counter value that are used for least significant bits in the slot table entry address is. The value setting device may be optional. For example, in an embodiment, a device or an end-user directly supplies a configuration setting value to the slot table address system 568.

In an exemplary operation of the slot table address system 568, a slot table entry address is generated by combining a slot counter value that is logical shifted left with a masked version of a cycle counter value. In an embodiment, the most-significant bits in the cycle counter value are not used to generate the slot table entry address. Therefore, the most-significant bits in the cycle counter value do not affect the resulting slot table entry address.

Figure 6:
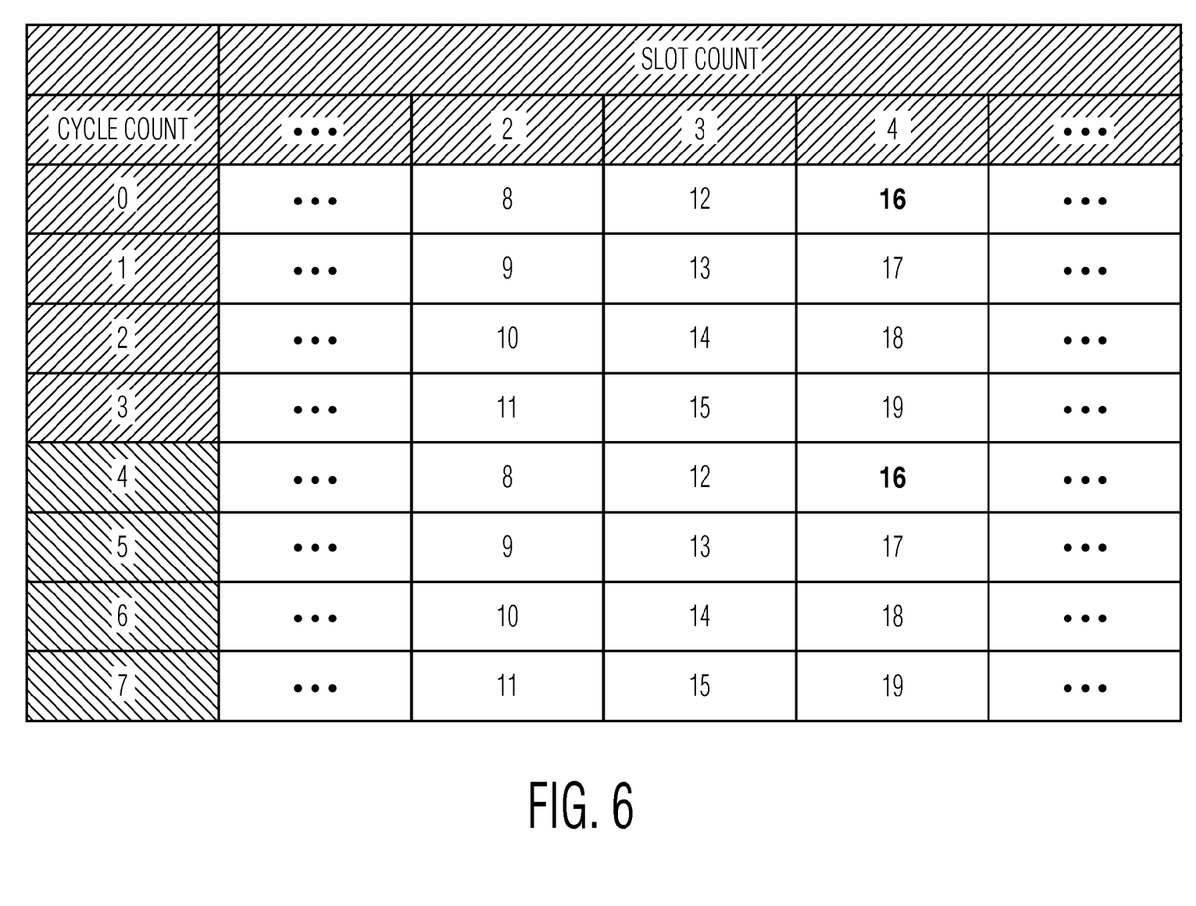
FIGS. 6 and 7 show examples of slot counter values, cycle counter values, and slot table addresses derived using the slot counter values and the cycle counter values in accordance with an embodiment of the invention.
Figure 7:
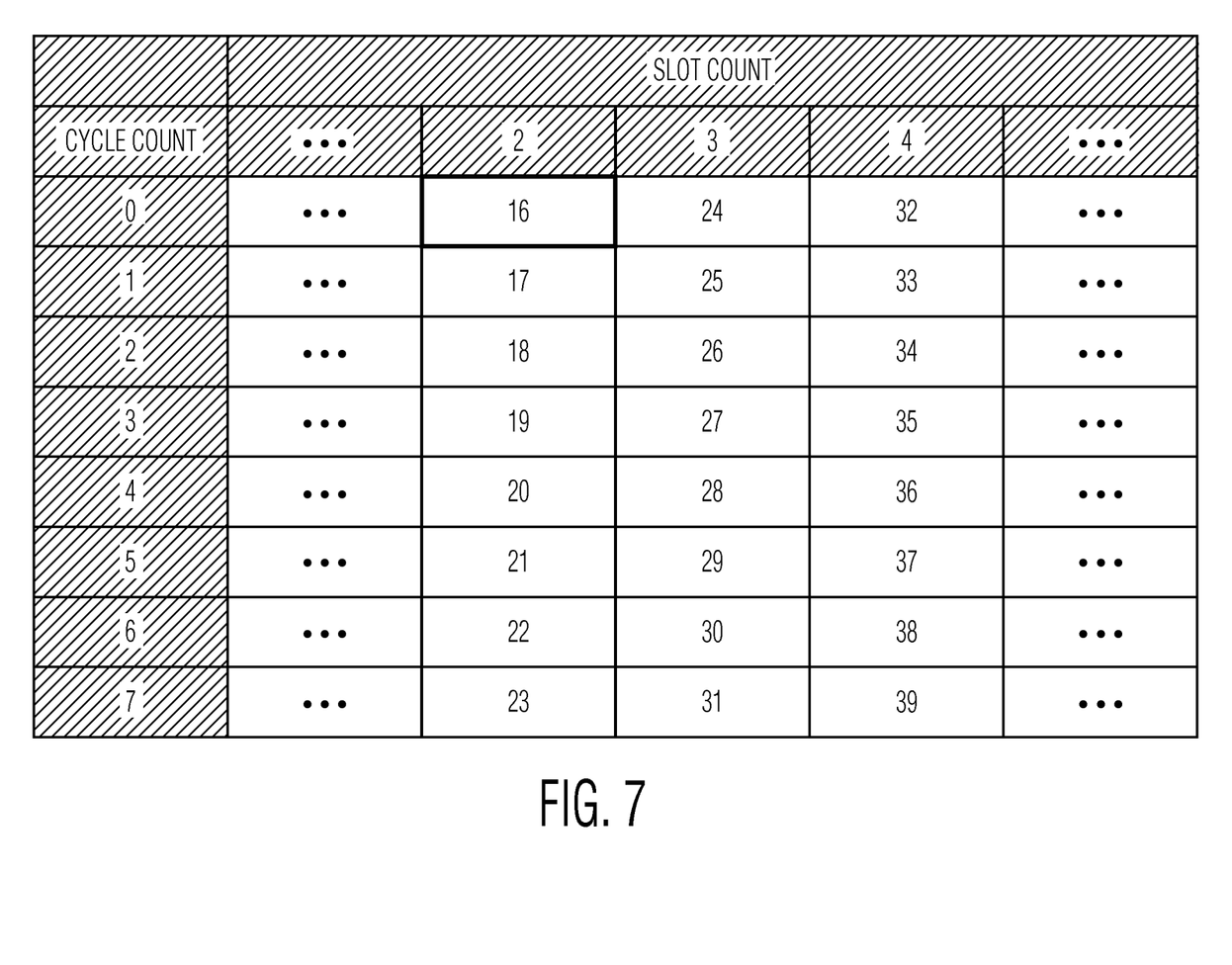

FIGS. 6 and 7 show some examples of slot counter values, cycle counter values, and slot table addresses derived using the slot counter values and the cycle counter values. In the examples shown in FIG. 6, the configuration setting value is 2, the slot counter values are shifted left by 2, and the cycle counter values is masked by "$2^{n\_cycle\_count\_bits}-1=3$." Slot table addresses, slot counter values, and cycle counter values shown in FIG. 6 satisfy: slot_table_address=(slot_counter_nxt<<2) OR (cycle_counter_nxt AND 3), where "slot_table_address" represents a slot table address, "slot_counter_nxt" represents a slot counter value, and "cycle_counter_nxt" represents a cycle counter value. In the examples shown in FIG. 6, the masking operation performed by the bit masking device 562 is an AND operation. As shown in FIG. 6, slot table addresses for cycle counts 0-3 are the same as the slot table addresses for cycle counts 4-7. Because slot table addresses for cycle counts 0-3 are identical as the slot table addresses for cycle counts 4-7, slot table addresses are reused.

In the examples shown in FIG. 7, the configuration setting value is 3, the slot counter values are shifted left by 3, and the cycle counter values is masked by "$2^{n\_cycle\_count\_bits}-1=7$." Slot table addresses, slot counter values, and cycle counter values shown in FIG. 7 satisfy: slot_table_address=(slot_counter_nxt<<3) OR (cycle_counter_nxt AND 7), where "slot_table_address" represents a slot table address, "slot_counter_nxt" represents a slot counter value, and "cycle_counter_nxt" represents a cycle counter value. In the examples shown in FIG. 7, the masking operation performed by the bit masking device 562 is an AND operation. As shown in FIGS. 6 and 7, the slot table address for cycle count 0 and slot count 2 in FIG. 7 is the same as the slot table address for cycle count 0 and slot count 4 and the slot table address for cycle count 4 and slot count 4 in FIG. 6. The slot table address "16" is reused in the different use cases from different cycle/slot count combinations, depending on the configuration setting value.

Figure 8:
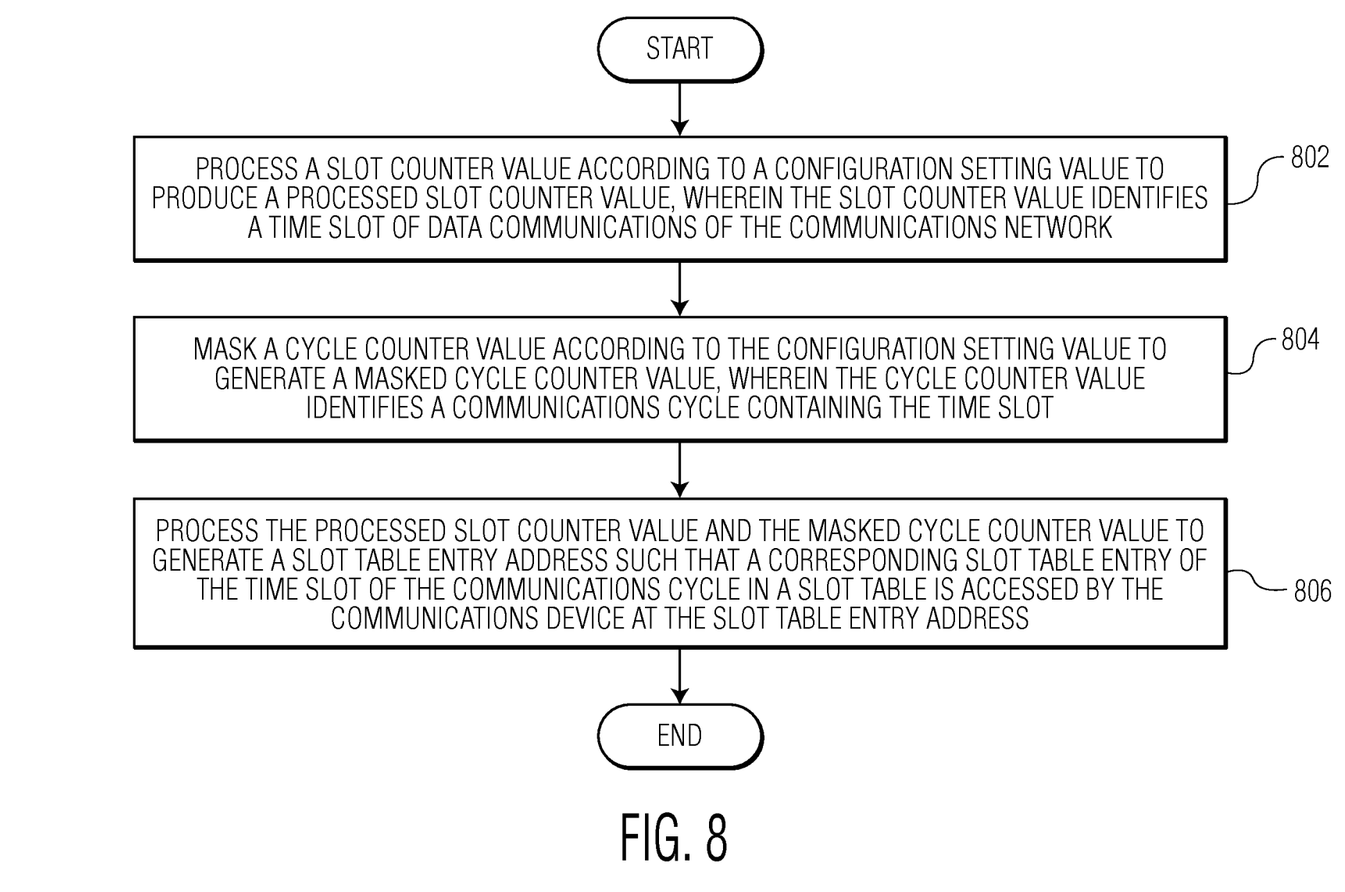
FIG. 8 is a process flow diagram of a method for generating a slot table entry address for a communications controller of a communications network to access a slot table in accordance with an embodiment of the invention.

FIG. 8 is a process flow diagram of a method for generating a slot table entry address for a communications device of a communications network to access a slot table in accordance with an embodiment of the invention. The communications controller may be similar to or same as the communications controller 104 depicted in FIG. 1, the switch 304 depicted in FIG. 3, and the CBG 404 depicted in FIG. 4. At block 802, a slot counter value is processed according to a configuration setting value to produce a processed slot counter value, where the slot counter value identifies a time slot of data communications of the communications network. At block 804, a cycle counter value is masked according to the configuration setting value to generate a masked cycle counter value, where the cycle counter value identifies a communications cycle containing the time slot. At block 806, the processed slot counter value and the masked cycle to counter value are processed to generate a slot table entry address such that a corresponding slot table entry of the time slot of the communications cycle in a slot table is accessed by the communications device at the slot table entry address.

The various components or units of the embodiments that have been described or depicted (e.g., the communications controller 104, the switch 304, the CBG 404, the slot table storage units 166, 366, 466, the slot table address systems 168, 368, 468, the bit shifting device 560, the bit masking device 562, the OR logic circuit 564, the value setting device 558, the state machines 342, 442, the communications devices 102-1, 102-2, 102-3, 102-4, 102-5, 102-6, 102-7, 102-8) may be implemented in hardware, software that is stored in a non-transitory computer readable medium or a combination of hardware and software that is stored in a non-transitory computer readable medium. The non-transitory computer readable medium can be an electronic, magnetic, optical, electromagnetic, infrared, or semiconductor system (or apparatus or device), or a propagation medium. Examples of a non-transitory computer-readable medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), a digital video disk (DVD), and a Blu-ray disk. Furthermore, the various components or units of the embodiments (e.g., the communications controller 104, the switch 304, the CBG 404, the slot table storage units 166, 366, 466, the slot table address systems 168, 368, 468, the bit shifting device 560, the bit masking device 562, the OR logic circuit 564, the value setting device 558, the state machines 342, 442, the communications devices 102-1, 102-2, 102-3, 102-4, 102-5, 102-6, 102-7, 102-8) that have been described or depicted may be implemented in a processor, which may include a multifunction processor and/or an application-specific processor.

Although the operations of the method herein are shown and described in a particular order, the order of the operations of the method may be altered so that certain operations may be performed in an inverse order or so that certain operations may be performed, at least in part, concurrently with other operations. In another embodiment, instructions or sub-operations of distinct to operations may be implemented in an intermittent and/or alternating manner.

In addition, although specific embodiments of the invention that have been described or depicted include several components described or depicted herein, other embodiments of the invention may include fewer or more components to implement less or more feature.

Furthermore, although specific embodiments of the invention have been described and depicted, the invention is not to be limited to the specific forms or arrangements of parts so described and depicted. The scope of the invention is to be defined by the claims appended hereto and their equivalents.

What is claimed is:

1. A method for generating a slot table entry address for a communications device of a communications network, the method comprising:
   processing a slot counter value according to a configuration setting value to produce a processed slot counter value, wherein the slot counter value identifies a time slot of data communications of the communications network;
   masking a cycle counter value according to the configuration setting value to generate a masked cycle counter value, wherein the cycle counter value identifies a communications cycle containing the time slot; and
   processing the processed slot counter value and the masked cycle counter value to generate a slot table entry address such that a corresponding slot table entry of the time slot of the communications cycle in a slot table is accessed by the communications device at the slot table entry address.

2. The method of claim 1 further comprising setting the configuration setting value such that the number of bits of the slot counter value that are used in the slot table entry address and the number of bits of the cycle counter value that are used in the slot table entry address are specified.

3. The method of claim 2, wherein setting the configuration setting value comprises setting the configuration setting value such that the number of bits of the cycle counter value that are used for least significant bits in the slot table entry address is specified.

4. The method of claim 1, wherein processing the slot counter value comprises shifting the slot counter value in the direction from least significant bits to most significant bits according to the configuration setting value.

5. The method of claim 1, wherein processing the slot counter value comprises performing a multiplication operation between the slot counter value and the configuration setting value.

6. The method of claim 1, wherein processing the processed slot counter value and the masked cycle counter value to generate the slot table entry address comprises performing a logical OR operation on the processed slot counter value and the masked cycle counter value.

7. The method of claim 1, wherein processing the processed slot counter value and the masked cycle counter value to generate the slot table entry address comprises performing an addition operation on the processed slot counter value and the masked cycle counter value.

8. The method of claim 1, wherein the most-significant bits of the cycle counter value are not used to generate the slot table entry address.

9. The method of claim 1, wherein the communications device is a communications controller, and wherein the slot counter value identifies the time slot of data communications between communications nodes of the communications network through the communications controller.

10. The method of claim 9, wherein the communications controller is a switch.

11. The method of claim 9, wherein the communications controller is a central bus guardian (CBG).

12. The method of claim 1, wherein the slot counter value identifies the time slot of data communications between the communications device and another communications device of the communications network.

13. A system for generating a slot table entry address for a communications device of a communications network, the system comprising:
   a first bit processing device configured to process a slot counter value according to a configuration setting value to produce a processed slot counter value, wherein the slot counter value identifies a time slot of data communications of the communications network;

a bit masking device configured to mask a cycle counter value according to the configuration setting value to generate a masked cycle counter value, wherein the cycle counter value identifies a communications cycle containing the time slot; and a second bit processing device configured to process the processed slot counter value and the masked cycle counter value to generate a slot table entry address such that a corresponding slot table entry of the time slot of the communications cycle in a slot table is accessed by the communications device at the slot table entry address.

14. The system of claim 13 further comprising a value setting device configured to:

set the configuration setting value such that the number of bits of the slot counter value that are used in the slot table entry address and the number of bits of the cycle counter value that are used in the slot table entry address are specified; and set the configuration setting value such that the number of bits of the cycle counter value that are used for least significant bits in the slot table entry address is specified.

15. The system of claim 13, wherein the first bit processing device is further configured to shift the slot counter value in the direction from least significant bits to most significant bits according to the configuration setting value.

16. The system of claim 13, wherein the first bit processing device is further configured to perform a multiplication operation between the slot counter value and the configuration setting value.

17. The system of claim 13, wherein the second bit processing device is further configured to:

perform a logical OR operation on the processed slot counter value and the masked cycle counter value; and/or perform an addition operation on the processed slot counter value and the masked cycle counter value.

18. A method for generating a slot table entry address for a FlexRay-compatible communications device of a communications network, the method comprising:

processing a slot counter value according to a configuration setting value to produce a processed slot counter value, wherein the slot counter value identifies a time slot of data communications of the communications network;

masking a cycle counter value according to the configuration setting value to generate a masked cycle counter value, wherein the cycle counter value identifies a communications cycle containing the time slot; and processing the processed slot counter value and the masked cycle counter value to generate a slot table entry address such that a corresponding slot table entry of the time slot of the communications cycle in a slot table is accessed by the FlexRay-compatible communications device at the slot table entry address.

19. The method of claim 18, wherein the FlexRay-compatible communications device is a FlexRay-compatible communications controller, wherein the slot counter value identifies the time slot of data communications between communications nodes of the communications network through the FlexRay-compatible communications controller, and wherein the FlexRay-compatible communications controller is a FlexRay-compatible switch or a FlexRay-compatible central bus guardian (CBG).

20. The method of claim 18, wherein the slot counter value identifies the time slot of data communications between the FlexRay-compatible communications device and another FlexRay-compatible communications device of the communications network.

* * * * *